United States Patent [19]

Haberle et al.

[11] 4,145,077
[45] Mar. 20, 1979

[54] BUMPER COVERING FOR MOTOR VEHICLES

[75] Inventors: Fritz Haberle; Daniel Riechers, both of Sindelfingen; Alfred Hochrathner, Büblingen, all of Fed. Rep. of Germany

[73] Assignee: Daimler-Benz Aktiengesellschaft, Fed. Rep. of Germany

[21] Appl. No.: 792,555

[22] Filed: May 2, 1977

Related U.S. Application Data

[63] Continuation-in-part of Ser. No. 547,164, Feb. 5, 1975, abandoned.

[30] Foreign Application Priority Data

Feb. 6, 1974 [DE] Fed. Rep. of Germany ....... 2405562

[51] Int. Cl.² .............................................. B60R 19/02
[52] U.S. Cl. .................................................... 293/102
[58] Field of Search .................. 293/1, 60, 62, 63, 70, 293/71 R, 73, 85, 89, 88, 99; 296/28 R, 35 B; D12/169

[56] References Cited

U.S. PATENT DOCUMENTS

| 2,062,327 | 12/1936 | Morrison | 293/88 X |
|---|---|---|---|
| 2,194,459 | 3/1940 | Frank | 293/62 |
| 2,236,670 | 4/1941 | Cadwallader et al. | 293/63 |
| 2,800,359 | 7/1957 | Mersheimer | 296/28 R |
| 3,056,620 | 10/1962 | Adams et al. | 293/99 X |
| 3,820,772 | 6/1974 | Kerr et al. | 293/70 X |
| 3,869,164 | 3/1975 | Schwenk | 293/71 R X |
| 3,869,165 | 3/1975 | Miller | 293/71 R X |
| 3,887,223 | 6/1975 | Bez | 293/70 |
| 3,895,835 | 7/1975 | Thomson | 293/1 X |

FOREIGN PATENT DOCUMENTS 1181470 2/1970 United Kingdom ...................... 293/70

OTHER PUBLICATIONS

Pp. 21 and 22 of a Datsun Brochure Showing 1974 1/2 Datsun 260-Z's Bumpers.
Section from Parts Catalog Published by GM Parts Division, GMC, Showing 1973 Chevelle's Front Bumper.

Primary Examiner—Robert B. Reeves
Assistant Examiner—Andres Kashnikow
Attorney, Agent, or Firm—Craig & Antonelli

[57] ABSTRACT

A motor vehicle bumper-covering for bridging the upper gap between the vehicle body and the bumper structure is supported at the vehicle body, and consists of an upper covering strip combined with two lateral or side parts forming pocket-shaped members for covering or enclosing the ends of the bumper. The covering strip and the lateral pocket-shaped parts are a soft elastic material which is securely connected with the vehicle body by fasteners, such as threaded screws or bolts, acting in conjunction with fastening plates of a hard material. A preferably construction of the pocket-shaped lateral portions of the bumper covering includes a generally C-shaped cross-sectional profiled configuration with the opened side of the configuration facing the vehicle body; the C-shaped profiled lateral pocket member being attached to the vehicle body by a holding plate clamping the edges of the pocket-like member to the wall of the vehicle body in conjunction with a fastening member. The bumper structure may be of the type supported at the vehicle by yielding energy-absorbing members.

25 Claims, 11 Drawing Figures

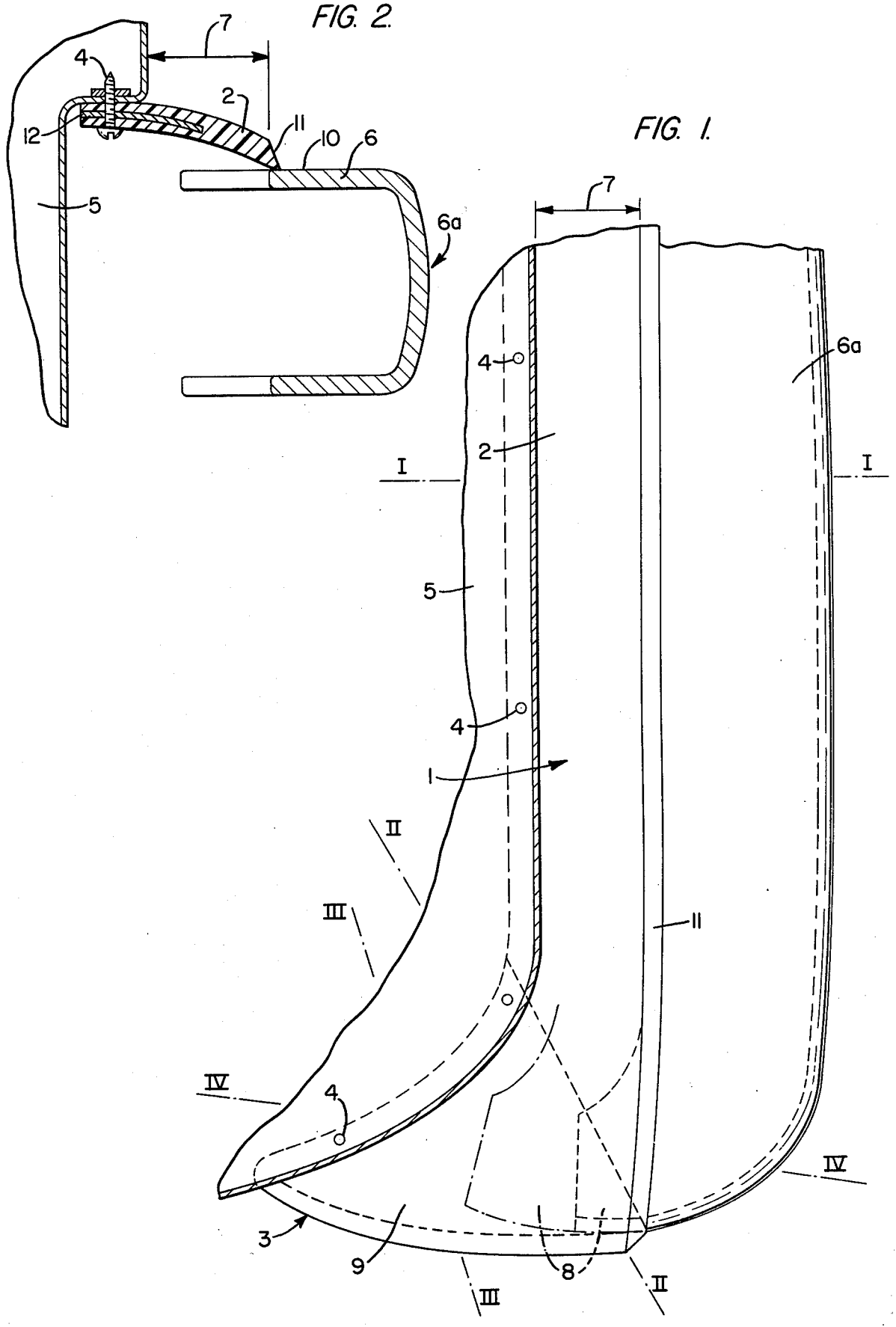

BUMPER COVERING FOR MOTOR VEHICLES

The present application is a continuation-in-part of copending U.S. patent application, Ser. No. 547,164, filed Feb. 5, 1975, and now abandoned the subject matter of which is hereby incorporated by reference, and the benefit of the earlier filing date is hereby claimed for all common subject matter.

The present invention relates to a bumper covering in motor vehicles for bridging the upper gap between the vehicle body and the bumper of the vehicle, and more particularly a bumper covering including an upper covering strip extending along the upper periphery of the bumper and having two side portions extending around the ends of the vehicle bumper.

A bumper with a gap covering of sheet steel is known in the art which is anchored in the rubber profile of the bumper. This construction, however, entails the disadvantage that in case of an impact on the bumper, the gap covering is also displaced and a consequent damage of the vehicle body cannot be precluded.

Furthermore, a bumper is known having lateral parts made of metallic or soft-elastic materials which especially in vehicles with energy-absorbing and regenerable bumpers are so arranged that they are movable parallel to the body in case of a unilateral inward deflection of the bumper in order not to damage the body. The deformation which then occurs between the bumper and lateral parts can be absorbed by hinges, springs, or inherent elasticity.

A bumper construction has also been contemplated in U.S. Pat. No. 2,062,327, in which a bumper element slides in relation to the vehicle body when struck. The body portion at the sides including the fenders are shaped to blend with the bumper element in a symmetrical manner such that the top portion of the bumper element projects inwardly under the edge of the fender body members. The gap between the top of the bumper element and the body portions is filled with a rubber packing member connected to the bumper element to absorb vibrations and movement of the parts and prevent resultant noise. The ends of the bumper element curve around the sides of the vehicle to blend with the edges of the lateral fender body portions, and the rubber packing member is also inserted in the gap between the bumper ends and the edges of the fenders. However, an indirect impact on this bumper element will result in impact of the bumper element with the fender body portions, thereby incurring damage thereto even in case of minor collisions.

A further prior bumper structure is provided in U.S. Pat. No. 2,194,459, in which a bumper plate is mounted with vertical grill and fender guards to be telescoped into adjacent parts of the vehicle body. Thin sheet metal shrouds are arranged between the edges of the bumper plate and guards and the adjacent vehicle parts. In this arrangement, the ends of the bumper curve laterally about the vehicle body, and may telescope into a side plate of the vehicle body engaging the bumper ends. Indirect impacts, as well as major impacts, on the bumper result in damage to the vehicle body structure.

Another bumper arrangement for absorbing impacts thereon has been previously contemplated in U.S. Pat. No. 3,869,165, in which an independent vehicle body end portion is constructed of resilient material which encases a bumper being mounted to the vehicle undercarriage by way of a shock absorber. However, this independent vehicle body portion itself is arranged at a gap from the remaining vehicle body portions, and provides a complex and costly structure.

A prior bumper structure is shown in U.S. Pat. No. 2,800,359, in which a U-channel bumper encloses the edges of vehicle body panels.

A still further prior bumper construction has been contemplated in which a separate bumper sight shield is securely connected to an upper bumper surface and two separate bumper sides are securely connected to the vehicle body portions at the bumper ends. The two separate bumper sides extend about the lateral vehicle body portions and mold the ends of the bumper thereto. In the case of an impact on the bumper, both the bumper and the sight shield are carried together into the vehicle body structure, but the two separate bumper sides will flatten out, especially during side impacts, and provide no protection of the vehicle body panels.

Bumpers without energy-absorbing or regenerable mountings to the vehicles are extended in part relatively far around the body, and the lateral or side parts of the bumpers fastened to the body may cause damage of a larger extent at the body even in cases of smaller or minor collisions.

It is the aim of the present invention to combine the gap covering means and the bumper lateral parts, which have completely different functions, into a single structural part, so as to not only avoid the aforementioned damages at the vehicle body, and consequently the repair costs connected thereto in case of relatively slight collisions, but also for styling and manufacturing reasons.

The underlying problems are solved according to the present invention in that the bumper covering structure consists of an upper covering strip extending along the upper edge of the bumper, combined with two lateral or side portions. The entire bumper covering structure is rigidly connected with the vehicle body.

According to another feature of the present invention, the upper covering strip may be arranged to be on the outside of the upper bumper profile, and each lateral or side part may include a pocket-shaped bulge or convexity which at least partly surrounds the bumper end. This arrangement offers additionally the advantage that machining of the bumper ends is minimized, and depending on the construction, the lateral parts of the bumper covering structure may be extended to completely or only partly enclose the bumper cross-section.

A particularly advantageous arrangement results from a C-shaped profile configuration of the lateral part of the bumper covering structure, which C-shaped profile has its opening facing toward the vehicle body, and wherein edges of the opening of the profiled lateral part are clamped to the body structure by means of holding plates attached to the vehicle body structure by means of fastening members.

The fastening members may include threaded bolt and nut members engaging respectively opposite sides of the holding plate and the vehicle body panel, and may further include interposed holding sleeves and/or clamping washers.

This preferred construction advantageously achieves a cushion of the lateral part in which the bumper ends slide, which cushion noticeably reduces shock in case of collisions, even minor impacts.

Furthermore, the upper covering strip may be arranged at least partly on the inside of the bumper profile; however, the bumper strip may also be disposed, at least in part, flush with the bumper profile. Many possibilities are provided as a result thereof to establish a transition from the body to the bumper which has an appealing shape.

The bumper covering structure may be subdivided, or interrupted, at least once for manufacturing and decorative purposes, as well as other reasons. A subdivision may be realized, for example, in the center of the covering strip so that the covering consists of a left and right part. However, subdivision may also be realized in the region of the transition to the lateral part, or shortly in front thereof. A subdivision exists if the mutually separated parts abut one another in a line of intersection. In contrast thereto, the separated parts with an interruption may be disposed at a distance to the line of intersection.

In addition, the bumper covering structure may be made of a soft elastic and/or hard material.

With the use of soft elastic material, the edge contacting the surface of the bumper may be installed with a prestress, whereby the arrangement of the bumper becomes less sensitive against manufacturing tolerances. There beyond, the lateral part is deformable so that with a unilateral retraction or deflection of the bumper, jamming is avoided and lesser contacts and/or influences from the outside remain without consequences to the vehicle body. Also, with use in vehicles without energy-absorbing, regenerable, and lateral mounting means, the body can be protected by the soft elastic lateral parts in case of a minor collision.

However, the covering strip may also consist of a soft elastic material, whereas the lateral parts may be made of a hard material, or vice versa. Of course, material colorings may be realized, for example, by the use of synthetic resinous materials.

Possibilities result therefrom to combine the lateral parts and covering strip of material with different optimum properties and colors, and to match the same to desired requirements.

Furthermore, fastening plates of a hard material, for example, of steel plate or steel sheet metal material may be provided at the parts of the bumper covering structure, which are made of soft elastic material, for fastening of the bumper covering to the body. These fastening plates may be, for example, inserted, vulcanized-in, or attached externally to the bumper covering structure.

Finally, the edges of the covering strip facing the bumper may be rounded off, or may be bevelled off and sealing-lip-shaped.

The aforementioned features may be used for bumpers in motor vehicles, either individually or also in any desired combination.

Accordingly, it is an object of the present invention to provide a bumper covering structure for motor vehicles which avoids by simple means the aforementioned shortcomings and drawbacks encountered in the prior art.

Another object of the present invention resides in a bumper covering structure for motor vehicles in which damage to the vehicle body is essentially precluded in cases of small or minor collisions.

A further object of the present invention resides in a bumper covering structure in which the gap covering strip and lateral parts are combined, not only to avoid damages at the body in case of minor collisions, but also to enable an improved styling thereof.

Still another object of the present invention resides in a bumper covering structure for motor vehicles which is relatively inexpensive, yet assures an appealing transition from the vehicle body to the bumper.

These and other objects, features, and advantages of the present invention will become more apparent from the following description, when taken in connection with the accompanying drawings which show, for purposes of illustration only, several embodiments in accordance with the present invention, and wherein:

FIG. 1 is a partial plan view of a bumper covering in accordance with the present invention, arranged on the outside of the bumper;

FIG. 2 is a partial cross-sectional view taken along line I—I of FIG. 1;

Figure 3:
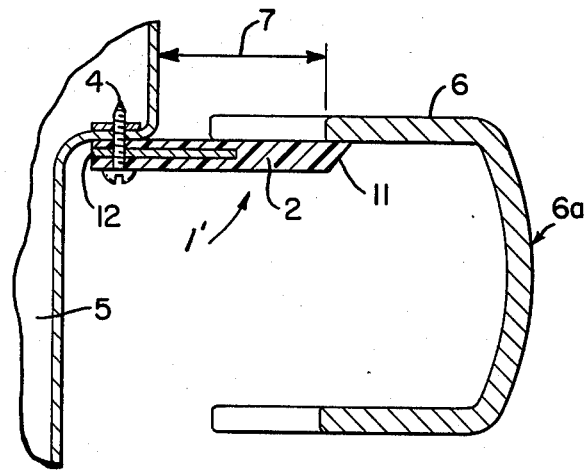
FIG. 3 is a partial cross-sectional view, similar to FIG. 2, when taken along line I—I of FIG. 1, which illustrates a bumper-covering structure in accordance with the present invention arranged on the inside of the bumper profile.

Referring now to the drawings, wherein the same reference numerals are used throughout the various views to designate similar parts, the modified embodiments being distinguished by a ', ", etc., the structurally combined bumper covering generally designated by reference numeral 1, as illustrated in FIGS. 1 and 2, comprises a covering strip 2 and two lateral parts 3, and is secured at the body 5 of the vehicle outside of the bumper profile 6 by fastening means, for example, by screws 4. The covering strip 2 serves for bridging the gap 7 between the bumper, generally designated by reference numeral 6a, and the vehicle body 5. The lateral parts 3 extend around the sides of the body 5, and possess pocket-shaped bulges or convexities 9 for receiving the bumper ends 8 of the bumper 6a.

The bulges 9 can be suitably adapted to the body from a styling point of view to blend relatively smoothly with the sides of the body. In case of an impact on the bumper 6a, the bumper ends 8 can move more deeply into the pocket-shaped bulges 9 of the lateral parts, particularly by the use of a yielding support for the bumper 6a. At the same time, the covering strip 2 is able to slide along the upper leg 10 of the essentially U-shaped bumper profile 6.

The edges 11 of the covering 1 which face the bumper 6a may be rounded off or may be bevelled off in a sealing-lip shape. Additionally, fastening plates may be embedded into, vulcanized-in, or attached externally at the fastening places with respect to the fasteners, such as the screws 4, especially with bumper coverings of soft-elastic material, in order to assure a good fastening at the body 5.

A bumper covering generally designated by reference numeral 1' is illustrated in FIG. 3 which is arranged on the inside of the bumper profile 6.

Figure 4:
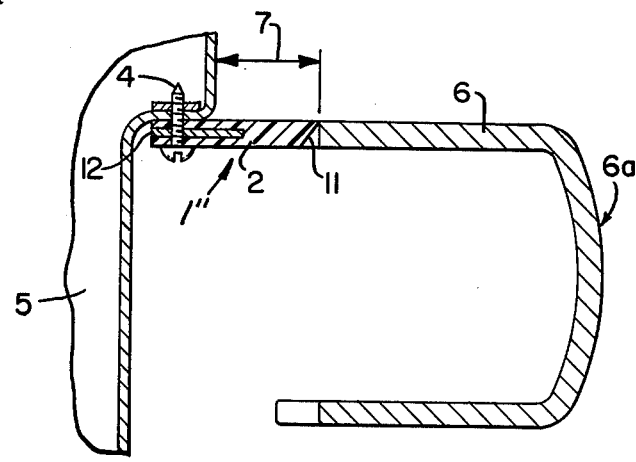
FIG. 4 is a cross-sectional view, similar to FIGS. 2 and 3, and taken along line I—I of FIG. 1, which illustrates a bumper-covering structure in accordance with the present invention which is arranged flush with the bumper profile.

FIG. 4 illustrates another embodiment with a flush arrangement of the covering generally designated by reference numeral 1" relative to the bumper 6.

Figure 5:
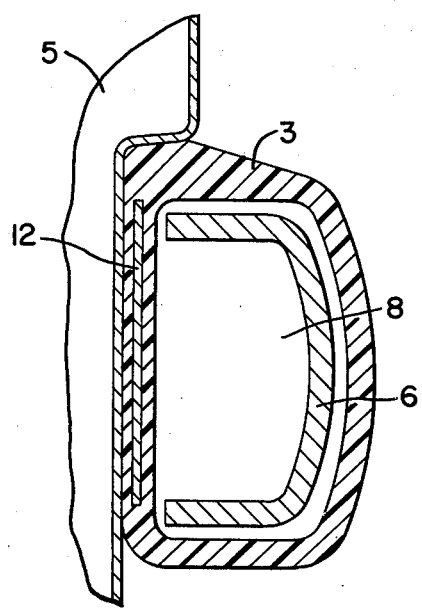
FIG. 5 is a cross-sectional view taken along line II—II of FIG. 1 through a pocket-shaped lateral part of the bumper-covering structure in accordance with the present invention.

FIG. 5 illustrates a cross-section through a lateral part 3 constructed with pocket-shaped bulges 9. The bumper ends 8 engage or extend at least partly into the bulges 9 during the normal construction of the bumper. Upon impact on the bumper 6a, the bumper ends 8 may be carried or moved more deeply into the pocket-shaped bulges 9, as may be seen by the dotted-chain line in FIG. 1.

Figure 6:
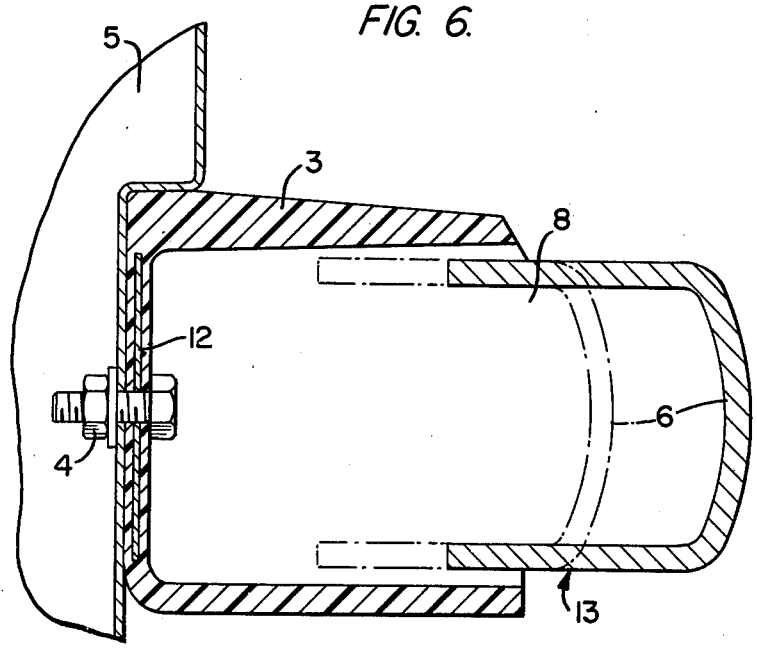
FIG. 6 is a cross-sectional view taken along line IV—IV of FIG. 1, and illustrating a bumper-covering structure in accordance with the present invention.

FIG. 6 illustrates a cross-section taken along line IV—IV of FIG. 1. The bumper covering 1 extends in this portion by virtue of the lower part of the pocket-shaped bulge 9 about the bottom side 13 of the bumper profile 6. Again, the movement of the bumper toward the vehicle body upon impact enables the bumper profile 6 to extend more deeply into the bumper covering 1, and particularly the pocket-shaped bulges 9, as may be further seen by the dot-chain line in FIG. 6.

Figure 7:
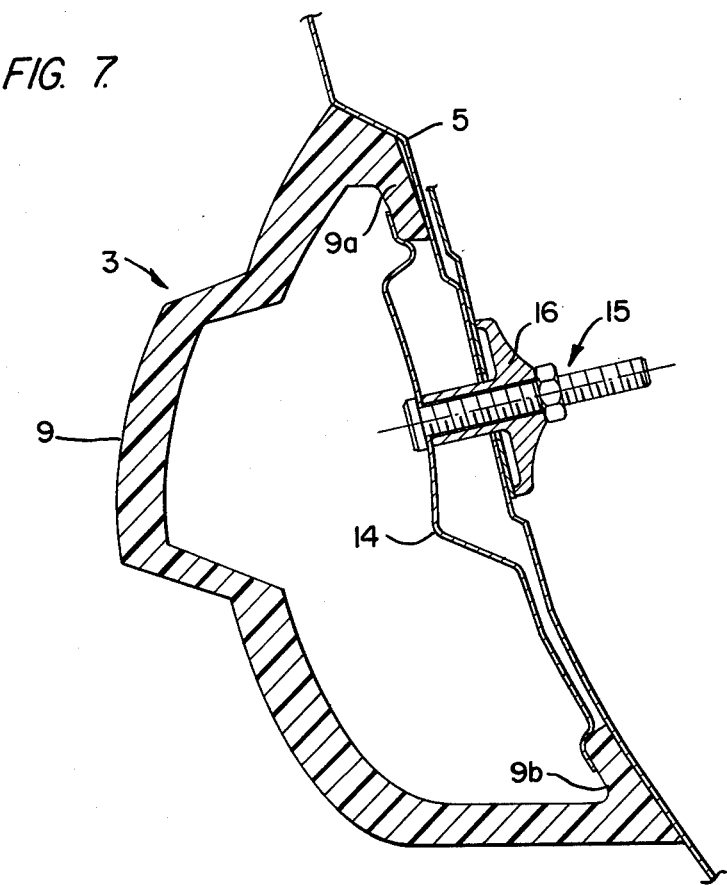
FIG. 7 is a cross-sectional view taken along line III—III of FIG. 1, and illustrating an embodiment of the pocket-shaped lateral part of the bumper-covering structure in accordance with the present invention.

FIG. 7 illustrates a cross-sectional view of a preferred construction for the pocket-shaped bulge 9, as may be seen along line III—III of FIG. 1. In this construction, the pocket-shaped bulge 9 is of a generally C-shaped configurational profile with the opened portion of the profile facing the vehicle body 5. The pocket-shaped portion 9 is provided with edges 9a and 9b which extend atleast partially against the sides or walls of the body 5, and this lateral part is held against the body 5 by virtue of a holding plate 14 clamping the edges 9a and 9b.

The holding plate 14 is held toward the body 5 by means of the fastener 15, such as the bolt and nut member illustrated, which may preferably extend through a central zone of the holding plate 14. In addition, in order to distribute the holding forces, as well as to provide a firmer connection, a holding sleeve 16 is interposed between the holding plate 14 and the body 5 with the holding sleeve having flange-like arms extending along the sides of the body 5. Accordingly, fastening of the member 15 clamps the holding plate 14 and holding sleeve 16 together, thereby resulting in a clamping of the edges 9a and 9b of the pocket-like member 9 against the body 5.

This arrangement of the fastening of the pocket-shaped member 9 to the body 5 of the vehicle enables the bumper ends 8 to freely slide or move therein during impacts on the bumper without engaging the body wall 5. On the other hand, in the case of indirect impacts, the fastening of the pocket-shaped member 9 by its edges to the body wall, leaving an effectively hollow space, provides a cushion-like member that absorbs at least minor side impacts thereon to effectively diminish the impact without damage to the body wall. This is, of course, most effective if the lateral parts 3 of the bumper covering are of a soft-elastic material.

Figure 8:
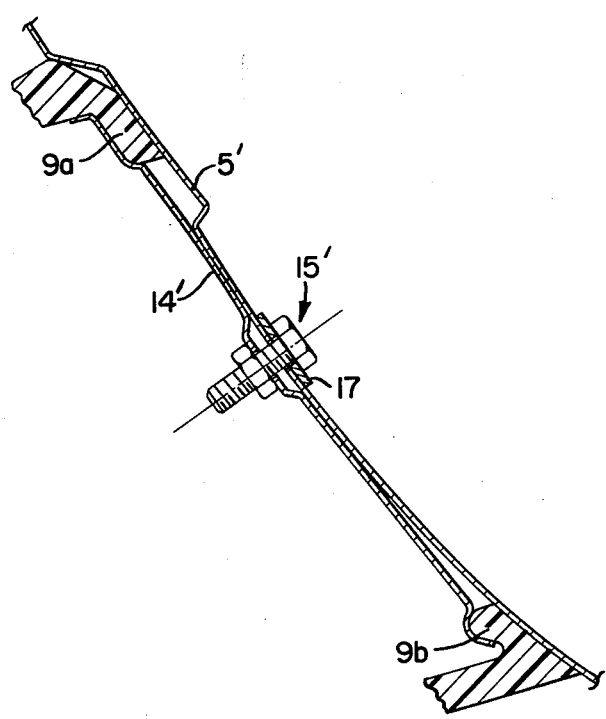
FIG. 8 is a partial cross-sectional view, similar to the right-hand side of FIG. 7, and illustrating a further arrangement of the connecting structure for the pocket-shaped lateral part of the bumper-covering structure in accordance with the present invention.

FIG. 8 illustrates a partial cross-section the clamping of the edges 9a and 9b of the pocket-shaped member 9 against the vehicle body 5'. In this case, the bolt and nut fastener 15' is designed to be fastened in a direction opposite to that illustrated in FIG. 7, which may be advantageously in accordance with different body constructions. Moreover, a clamping washer 17 may be utilized to distribute the holding forces of the fastener 15', and further, the holding plate 14' may have a recess at the fastener 15' so as to enable the plate 14' to be clamped against the walls of the vehicle body 5, thereby effecting a stronger connection resulting in the cushioning effect of the member 9.

Figure 9:
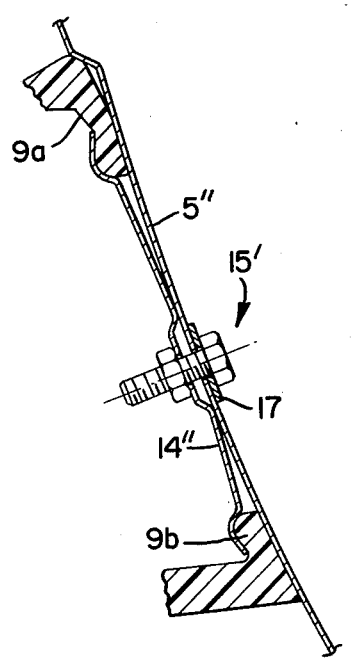
FIG. 9 is a partial cross-sectional view, similar to the right-hand side of FIG. 8, showing a further fastening arrangement of the pocket-shaped lateral part of the bumper-covering structure in accordance with the present invention.

FIG. 9 illustrates a further arrangement of the fastening of the edges 9a and 9b of the pocket-shaped member 9 to the vehicle body 5". In this regard, the ends of the edges 9a and 9b may protrude with a larger cross-section so as to receive configured recess ends of the holding plate 14", thereby effecting the clamping action of the edges 9a and 9b.

The construction of the bumper covering in accordance with the present invention is most advantageous in a bumper construction wherein the bumper 6a is secured to the vehicle fixed parts, such as the frame or cross-bearers, by means of a shock-absorber structure 18 having telescoping members 19 and 20. The member 19 of the shock absorber is fixed to the bumper 6a' through the fastening structure 21 which includes a flange-like member at the end of the member 19 having ends embedded into an elastic member 22 for cushioning vibrations of the bumper with respect to the shock absorber 18, and being assembled to the member 19 by means of the threaded connection 24. The other telescoping member 20 is fixed to the vehicle body 5 by means of the flange 25 so as to enable telescoping therein of the member 18 upon impacts against the bumper 6a'.

Figure 10:
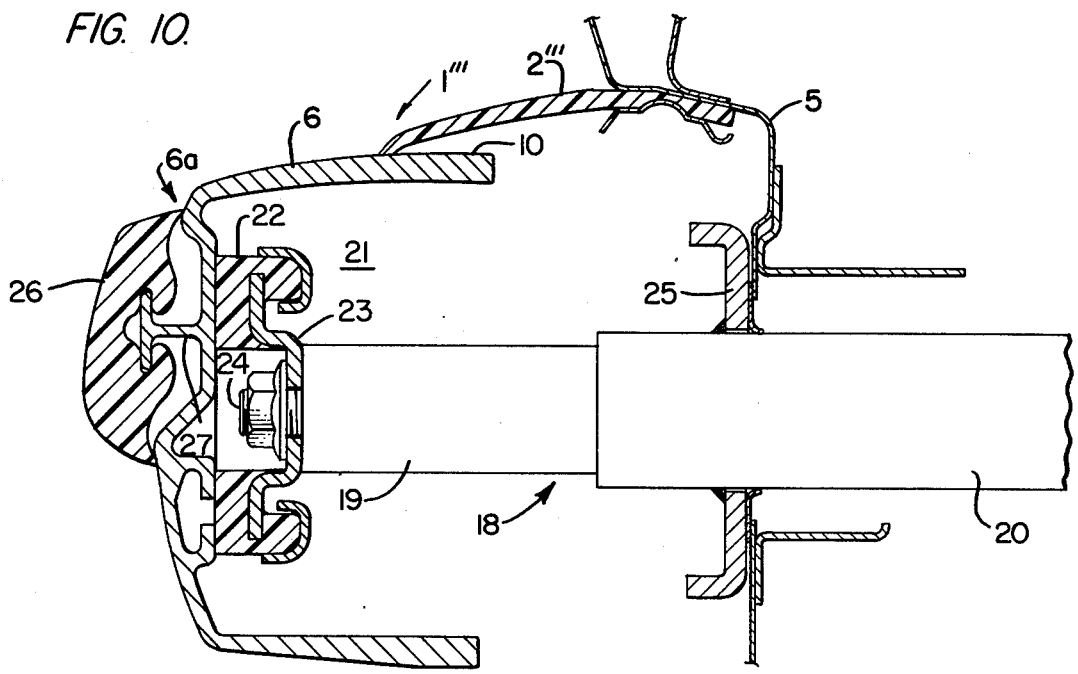
FIG. 10 is a cross-sectional view, similar to FIG. 2, and taken along line I—I of FIG. 1, which illustrates a bumper-covering structure in accordance with the present invention, together with a shock-absorbing mounting of a bumper.

FIG. 10 further illustrates the use of a soft-elastic bumper strip 26 fixed to the front of the bumper 6a', such as by means of the T-shaped flange 27 at the front of the bumper profile.

In addition, the upper strip 2''' of the bumper covering 1''' is fixed to the vehicle body 5 so as to override the upper edge 10 of the bumper profile.

Figure 11:
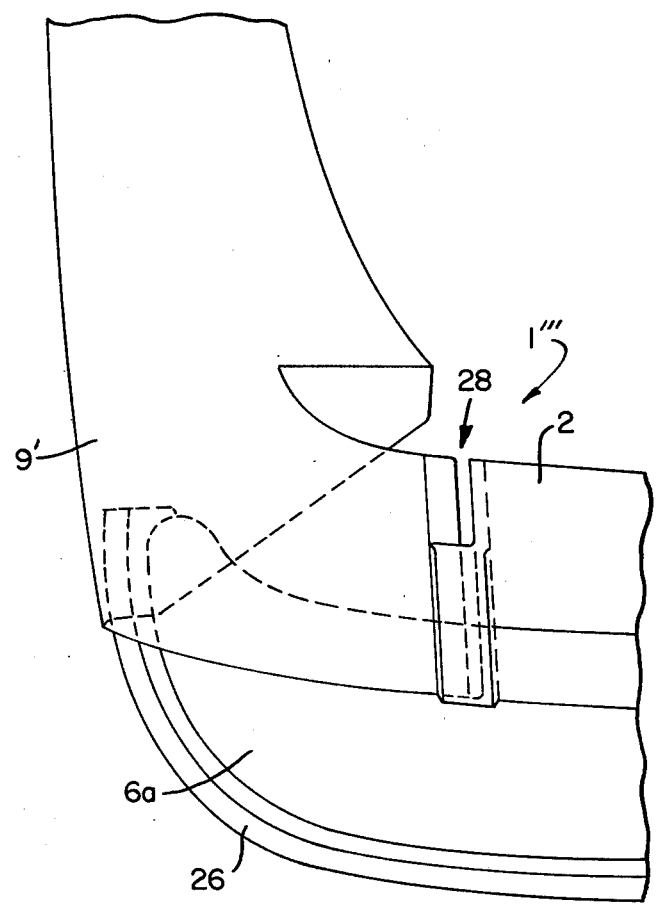
FIG. 11 is a partial plan view of a bumper covering in accordance with the present invention having an interruption or subdivision of the bumper-covering structure.

FIG. 11 illustrates in partial cross-section the construction of the bumper covering 1 having a subdivision or interruption. In FIG. 11, the subdivision is arranged in the region of the transition from the upper strip 2 to the pocket-shaped lateral part 9, but may also be realized at the center of the covering strip. The interruption occurs along the line of intersection 28 wherein the parts abut one another by means of an override or telescoping of one part with respect to the other.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In a bumper-covering for a motor vehicle having a body structure and a bumper member separated from said body structure by an upper gap, said bumper member having a central portion extending transversely with respect to the motor vehicle and ends which extend longitudinally with respect to said motor vehicle, the improvement comprising said bumper-covering including a strip means securely connected with said body structure for bridging said upper gap between said body structure and said bumper member, and pocket-shaped means integrally formed with each end of said strip means for covering at least a portion of the bumper ends, said strip means and said pocket-shaped means being at least partially constituted of soft-elastic material, wherein said pocket means completely encircles said portion of said bumper ends with clearance for enabling said bumper ends to be telescopingly displaced within said pocket means without engaging the vehicle body structure.

2. A bumper-covering according to claim 1, wherein said strip means extends along the outside top portion of said bumper member.

3. A bumper-covering according to claim 1, wherein said strip means extends along said bumper member with at least an edge portion of said strip means being arranged at least partly on the inside of said bumper member.

4. A bumper-covering according to claim 1, wherein said strip means extends along said bumper member at least partly flush with the upper edge portion of said bumper member.

5. A bumper-covering according to claim 1, wherein said strip means and said pocket-shaped means are further at least partly constituted of a hard material relative to said soft-elastic material.

6. A bumper-covering according to claim 1, wherein said improved bumper-covering is fastened at said body structure by means of fastening plates of a hard material relative to said soft-elastic material.

7. A bumper-covering according to claim 6, wherein said fastening plates are constituted of steel.

8. A bumper-covering according to claim 6, wherein the edges of said bumper-covering which face said bumper member are rounded off.

9. A bumper-covering according to claim 6, wherein the edges of said bumper-covering which face said bumper member are bevelled off in a sealing-lip-shape.

10. A bumper-covering according to claim 1, wherein the edges of said bumper-covering which face said bumper member are rounded off.

11. A bumper-covering according to claim 1, wherein the edges of said bumper-covering which face said bumper member are bevelled off in a sealing-lip-shape.

12. A bumper-covering according to claim 1, wherein said bumper-covering is a single structure consisting of said strip means and said pocket-shaped means.

13. A bumper-covering according to claim 1, wherein said strip means is at least once subdivided between each of said pocket-shaped means formed integrally therewith.

14. A bumper-covering according to claim 1, wherein said strip means is at least once interrupted between each of said pocket-shaped means formed integrally therewith.

15. A bumper-covering according to claim 1, wherein said bumper member is supported at said body structure by yielding energy-absorbing means.

16. A bumper-covering according to claim 1, wherein said pocket-shaped means include a C-shaped profiled member having an opened portion facing said body structure and clamping means for clamping the edges of said C-shaped member to said body structure.

17. A bumper-covering according to claim 16, wherein said clamping means include a holding plate engaging said edges of said C-shaped member and fastening means for securing said holding plate to said body structure.

18. A bumper-covering according to claim 17, wherein said fastening means include a nut and bolt assembly extending through said holding plate and said body structure and flange means engaged by said nut and bolt assembly or distributing clamping forces.

19. A bumper-covering according to claim 18, wherein said nut and bolt assembly extends through an approximately central portion of said holding plate.

20. A bumper-covering according to claim 19, wherein said strip means extends along the outside top portion of said bumper member.

21. A bumper-covering according to claim 20, wherein the edges of said bumper-covering which face said bumper member are bevelled off in a sealing-lip-shape.

22. A bumper-covering according to claim 21, wherein said bumper-covering is a single structure consisting of said strip means and said pocket-shaped means.

23. A bumper-covering according to claim 22, wherein said bumper member is supported at said body structure by yielding energy-absorbing means.

24. A bumper-covering according to claim 16, wherein said bumper-covering is a single structure consisting of said strip means and said pocket-shaped means.

25. A bumper-covering according to claim 16, wherein said bumper member is supported at said body structure by yielding energy-absorbing means.

* * * * *